United States Patent
Murakami (10) Patent No.: US 8,242,886 B2
(45) Date of Patent: Aug. 14, 2012

(54) DOOR LOCK CONTROL DEVICE

(75) Inventor: Hiroko Murakami, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 628 days.

(21) Appl. No.: 12/358,797

(22) Filed: Jan. 23, 2009

(65) Prior Publication Data

US 2009/0189735 A1 Jul. 30, 2009

(30) Foreign Application Priority Data

Jan. 24, 2008 (JP) .................................. 2008-14034

(51) Int. Cl.
*B60R 25/00* (2006.01)
(52) U.S. Cl. ...... 340/5.72; 340/5.31; 180/273; 180/279; 180/287
(58) Field of Classification Search .................. 340/5.72, 340/5.31; 180/273, 279, 287
See application file for complete search history.

(56) References Cited

U.S. PATENT DOCUMENTS

| | | | | |
|---|---|---|---|---|
| 5,382,948 A | * | 1/1995 | Richmond | 340/5.72 |
| 5,659,291 A | * | 8/1997 | Kennedy et al. | 340/457 |
| 5,745,030 A | * | 4/1998 | Aaron | 340/426.11 |
| 5,831,520 A | * | 11/1998 | Stephan | 340/457 |
| 5,973,611 A | * | 10/1999 | Kulha et al. | 340/5.62 |
| 6,704,114 B1 | * | 3/2004 | Poechmuller | 356/601 |
| 7,916,004 B2 | * | 3/2011 | Mackjust | 340/426.13 |
| 2007/0216517 A1 | * | 9/2007 | Kurpinski et al. | 340/5.72 |

* cited by examiner

*Primary Examiner* — Jennifer Mehmood
*Assistant Examiner* — Andrew Bee
(74) *Attorney, Agent, or Firm* — Oblon, Spivak, McClelland, Maier & Neustadt, L.L.P.

(57) ABSTRACT

A door lock control device that performs locking and/or unlocking of a door of a vehicle subject to a condition that a result of communication with a portable device has authenticated the portable device. The door lock control device has: an operation reception unit that is provided in the vehicle and receives an input for instructing the locking and/or unlocking of the door; a vehicle power source determination unit that determines whether a power source of the vehicle is ON; an occupant determination unit that determines whether an occupant is present in a cabin of the vehicle; and a power supply control unit that stops power supply to the operation reception unit when determination is made that the power source of the vehicle is ON and an occupant is present inside the vehicle cabin.

14 Claims, 4 Drawing Sheets

DOOR LOCK CONTROL DEVICE

INCORPORATION BY REFERENCE

The disclosure of Japanese Patent Application No. 2008-014034 filed on Jan. 24, 2008 including the specification, drawings and abstract is incorporated herein by reference in its entirety.

BACKGROUND OF THE INVENTION

1. Field of the Invention

The invention relates to a door lock control device, and more particularly to a door lock control device that controls door locking and/or unlocking correspondingly to an input result into an input unit provided in a vehicle subject to the condition that a portable device is present within a detection area around the vehicle.

2. Description of the Related Art

A technology for controlling door locking/unlocking correspondingly to a detection result of a touch sensor provided in a vehicle subject to the condition that a portable device is present within detection area around the vehicle has heretofore been suggested. For example, Japanese Patent Application Publication No. 2006-9312 (JP-A-2006-9312) discloses a door lock control device in which a touch sensor for locking (described as "lock sensor") and a touch sensor for unlocking (described as "unlock sensor") are provided in the vicinity of a door handle. This door lock control device determines whether a portable device is present within the detection area. When the lock sensor detects the touch in a state in which the presence of the portable device is recognized, the door is locked, and when the unlock sensor detects the touch, the door lock is releases (the door is unlocked).

In the door lock control device described in JP-A-2006-9312 electric power is constantly supplied from a power source to the lock control sensor (general name of the lock sensor and unlock sensor) and, therefore, a large amount of power of the power source of the vehicle is consumed. Furthermore, because the power is constantly supplied to the lock control sensors, radiation is constantly emitted from the sensor circuit and this radiation can adversely affect other circuits or antenna.

SUMMARY OF THE INVENTION

Accordingly, the invention provides a door lock control device that can supply electric power to lock control sensors only when necessary.

According to one aspect of the invention, there is provided a door lock control device that performs locking and/or unlocking of a door of a vehicle subject to the condition that a result of communication with a portable device has authenticated the portable device. The door lock control device includes:

an operation reception unit that is provided in the vehicle and receives an input for instructing the locking and/or unlocking of the door;

a vehicle power source determination unit that determines whether a power source of the vehicle is ON;

an occupant determination unit that determines whether an occupant is present in a cabin of the vehicle; and a power supply control unit that stops power supply to the operation reception unit when determination is made that the power source of the vehicle is ON and an occupant is present inside the vehicle cabin.

With the above-described door lock control device, power supply to the operation reception unit is stopped when the power source of the vehicle is ON and an occupant is present inside the vehicle cabin. Therefore, in the above-described case in which it seems to be unnecessary to perform the operation input to the operation reception unit, the unnecessary power supply to the operation reception unit can be prevented. Therefore, with the above-described door lock control device, by stopping unnecessary power supply to the operation reception unit it is possible to inhibit power consumption and also inhibit an adverse effect produced by radiation from the sensor circuit on other circuits.

BRIEF DESCRIPTION OF THE DRAWINGS

The features, advantages, and technological and industrial significance of this invention will be described in the following detailed description of example embodiments of the invention with reference to the accompanying drawings, in which like numerals denote like elements and wherein.

DETAILED DESCRIPTION OF EMBODIMENTS

Figure 1:
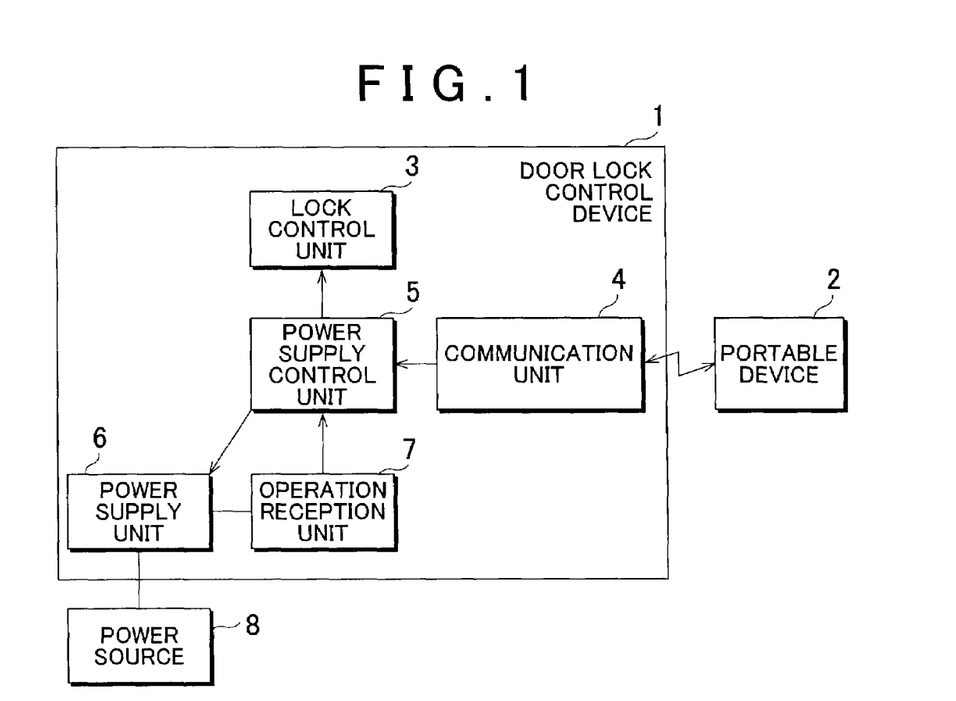
FIG. 1 is a block diagram illustrating a functional configuration of a door lock control system including a door lock control device on the present embodiment.

The door lock control device on an embodiment of the invention will be described below with reference to FIGS. 1 and 2. FIG. 1 is a block diagram illustrating a functional configuration of a door lock control system including the door lock control device on the present embodiment. Referring to FIG. 1, the door lock control system includes the door lock control device 1 of the present embodiment and a portable device 2 that can communicate with the door lock control device 1. The door lock control system shown in FIG. 1 controls locking and/or unlocking of a vehicle door. More specifically, the present door lock control system is one of the so-called smart key systems such that a vehicle door can be locked or unlocked, provided that the door lock control device 1 installed on the vehicle has communicated with a portable device 2 and the portable device 2 has been confirmed to be a valid key. As a result, only a valid user that has the valid portable device 2 can perform the door locking and unlocking operation.

Referring to FIG. 1, the door lock control device 1 includes a lock control unit 3, a communication unit 4, a power supply control unit 5, a power supply unit 6, and an operation reception unit 7. A power source 8 installed on the vehicle is connected to the power supply unit 6. Each unit of the door lock control device 1 of the present embodiment will be described below.

The lock control unit 3 is a device that locks and unlocks the vehicle door in response to a command from the below-described power supply control unit 5. Furthermore, the communication unit 4 includes an antenna or the like and wireless communicates with the portable device 2.

The operation reception unit 7 is an input device that is provided at the vehicle and receives inputs that instruct locking and unlocking. Thus, in the present embodiment, door locking/unlocking is carried out by performing input to the operation reception unit 7 in a state in which the user having the valid portable device 2 is present in the detection area around the vehicle (a state in which the portable device 2 is confirmed to be a valid key).

In the present embodiment, the operation reception unit 7 is a touch sensor for performing door locking (referred to hereinbelow as "lock sensor") and a touch sensor for performing door unlocking (referred to hereinbelow as "unlock sensor"). In the present embodiment, these lock sensor and unlock sensor correspond to the input unit described in the claims. Each sensor for lock (lock sensor and unlock sensor) is disposed on the outer side of the vehicle door, preferably in the vicinity of the door handle to facilitate user's operations. It is even more preferred that the lock sensor be disposed on the outside of the door handle (surface facing the outside of the vehicle) and the unlock sensor be disposed on the inside of the door handle (surface facing the inside of the vehicle). Furthermore, in the present embodiment, the operation reception unit 7 is assumed to have both the lock sensor and the unlock sensor, but in other embodiments, the operation reception unit may be configured to have either of an input device that receives an input that instructs door locking and an input device that receives an input that instructs door unlocking.

The operation reception unit 7 is not limited to a touch sensor and may have any configuration, provided that an input instructing door locking or unlocking can be received. For example, in another embodiment, the operation reception unit 7 may be a switch. When the operation reception unit 7 is a switch, it is also preferred that the operation reception unit be disposed in the vicinity of the door handle, similarly to the case in which the operation reception unit is a touch sensor. In another embodiment, a contactless input system may be used. In this case, the operation reception unit 7 is an antenna for receiving electromagnetic waves for a key operated by the user (this key may be identical to or different from the portable device 2).

The power supply control unit 5 is connected to the lock control unit 3, communication unit 4, power supply unit 6, and operation reception unit 7 and controls various operations in the door lock control device 1. More specifically, the power supply control unit 5 is an information processing device that controls door locking/unlocking and also controls power supply to the operation reception unit 7. In the present embodiment the power supply control unit 5 is realized as an electronic control unit (ECU) (smart ECU that controls a smart key system. However, in another embodiment, the power supply control unit 5 may be provided as a circuit that controls power supply to the operation reception unit 7 separately from the smart ECU.

The power supply control unit 5 controls the supply of power to the operation reception unit 7 by using the power supply unit 6. Thus, the power supply unit 6 is connected between the power source 8 and the operation reception unit 7 and performs ON/OFF of power supply from the power source 8 to the operation reception unit 7 according to the command from the power supply control unit 5. In the present embodiment, the power supply control unit 5 controls locking/unlocking of the vehicle door by using the lock control unit 3.

In the present embodiment, the power supply control unit 5 stops power supply to the operation reception unit 7 subject to the condition that the power source of the vehicle is ON and an occupant is present in the vehicle cabin. In the present embodiment, the case in which the operation reception unit 7 disposed outside the vehicle has to receive an input is the case in which an occupant releases (unlocks) the door lock to enter the vehicle and the case in which the occupant that got out of the vehicle locks the door. In other words, it is assumed that locking/unlocking is not performed when the occupant is inside the vehicle. Accordingly, in the present embodiment, when the above-described conditions are satisfied, the power supply control unit 5 determines that locking/unlocking is not performed and stops power supply to the operation reception unit 7 (that is, the lock sensor and unlock sensor). Thus, by stopping unnecessary power supply to the operation reception unit 7, it is possible to inhibit power consumption and inhibit the adverse effect produced by radiation from the sensor circuit on other circuits.

The operation of the door lock control device 1 will be described below. First, the lock/unlock control operation of the vehicle door performed by the door lock control device 1 will be described. The door lock control device 1 sends a transmission request signal from the communication unit 4 to the portable device 2 with a predetermined period and determines whether a response signal corresponding to the transmission request signal is received by the communication unit 4 from the portable device 2. When the response signal is received, the power supply control unit 5 performs authentication by using an identification (ID) code contained in the response signal. Thus, the power supply control unit compares the ID code contained in the response signal with an ID code that has been stored in advance by the door lock control device 1 and determines whether the two ID codes coincide. Where the determination shows that the two ID codes coincide, it is determined that the portable device 2 has been authenticated as a valid device. When the response signal is not received by the communication unit 4, or when the two ID codes do not coincide, the portable device 2 is not authenticated to be valid. The above-described lock/unlock control operation may be carried out, for example, only when the vehicle is parked (for example, when an engine switch is OFF or the door is locked). Furthermore, in another embodiment, the lock/unlock control operation may be performed only when electric power is supplied to the operation reception unit 7.

The power supply control operation performed by the power supply control unit 5 will be described below. FIG. 2 is a flowchart illustrating the flow of power supply control operation performed with the power supply control unit 5 of the door lock control device 1 of the present embodiment. In the power supply control operation shown in FIG. 2, in step S1, the power supply control unit 5 determines whether the power source of the vehicle is ON. The power source of the vehicle being ON indicates that an ignition power source is ON or an accessory power source is ON. Where the determination result of step S1 is positive, the processing of step S2 is executed. Where the determination result of step S1 is negative, the processing of the following step S4 is executed. In the present embodiment, the power supply control unit 5 that executes the step S1 corresponds to the vehicle power source determination unit described in the claims.

In step S2, the power supply control unit 5 determines whether an occupant is present in the vehicle cabin. In the present embodiment, the power supply control unit 5 that executes the step S2 corresponds to the occupant determination unit described in the claims. A specific example of the determination method of step S2 is described below.

(1) In the first determination method step S2, the power supply control unit 5 can determine whether an occupant is present inside the vehicle cabin on the basis of whether the portable device 2 is present inside the cabin. For example, the below-described method can be used for determining whether the portable device 2 is present inside the cabin. Thus, the vehicle (communication unit 4) has a plurality of antennas for communicating with the portable device 2, and the plurality of antennas include an antenna disposed inside the cabin and an antenna disposed outside the cabin. The antenna disposed inside the cabin and the antenna disposed outside the cabin send transmission request signals containing mutually different information. Furthermore, the portable device 2 sends different response signals in the case the transmission request signal is received from the antenna disposed inside the cabin and the case in which the transmission request signal is received from the antenna disposed outside the cabin. Accordingly, the power supply control unit 5 can determine whether the portable device 2 is present inside the cabin on the basis of contents of the response signal from the portable device 2.

Whether the portable device 2 is present inside the cabin may be also determined on the basis of whether the returned signal is received by the antenna disposed inside the cabin or by the antenna disposed outside the cabin. Thus, when the returned signal is not received by the antenna disposed inside the cabin (including the case in which the electromagnetic wave intensity of the returned signal received by the antenna disposed inside the cabin is larger than the electromagnetic wave intensity of the returned signal received by the antenna disposed outside the cabin), the power supply control unit 5 determines that an occupant is present inside the vehicle cabin. By contrast, when the returned signal is received by the antenna disposed outside the cabin (including the case in which the electromagnetic wave intensity of the returned signal received by the antenna disposed inside the cabin is smaller than the electromagnetic wave intensity of the returned signal received by the antenna disposed outside the cabin), the power supply control unit 5 determines that an occupant is not present inside the vehicle cabin.

(2) In the second determination method step S2, the power supply control unit 5 can determine whether an occupant is present inside the vehicle cabin on the basis of whether the occupant is contained in an image picked up by a camera installed inside the cabin. Thus, when at least one camera that picks up images inside the cabin is installed in the vehicle, the power supply control unit 5 analyzes the images picked up by the camera and determines whether an occupant is contained in the images. Where the occupant is contained in the images, the power supply control unit 5 can determine that the occupant is present inside the cabin, and when the occupant is not contained in the images, the power supply control unit can determine that the occupant is not present inside the cabin.

(3) In the third determination method step S2, the power supply control unit 5 can determine whether an occupant is present inside the cabin on the basis of whether an occupant is detected to be seating by a seating sensor disposed in a seat of the vehicle. In this case, a seating sensor is disposed in each seat of the vehicle, and the power supply control unit 5 determines whether an occupant is present inside the vehicle cabin on the basis of detection results obtained by the seating sensors. Thus, when none of the seating sensors detects a seating occupant, the power supply control unit 5 determines than no occupant is present inside the cabin, and when any of the seating sensors detects a seating occupant, the power supply control unit determines that an occupant is present inside the cabin.

"Determining whether an occupant is present inside the vehicle cabin" in the determination of step S2 may be a process of determining whether an occupant is present in the entire region inside the vehicle cabin or a process of determining whether an occupant is present in a predetermined region inside the vehicle cabin. The predetermined region as referred to herein is, for example, a driver seat region or a front-seat region of the cabin (region of driver seat and passenger seat). For example, in the above-described second determination method, a camera may be provided so as to pick up the aforementioned predetermined region inside the cabin. In the above-described third determination method, a seating sensor may be provided only in the seat(s) in the aforementioned predetermined region.

The three methods referred to as the first to third determination method are explained above as specific examples of determination methods of step S2, but the determination method of step S2 is not limited to these three methods, and any method may be used, provided that the presence of an occupant inside the cabin can be determined. For example, in the present embodiment, the power supply control unit 5 may detect the vehicle speed by using a vehicle speed sensor and perform the determination of step S2 on the basis of the detected vehicle speed. Thus, when the vehicle speed is more than "0" (the case in which the vehicle travels), an occupant is determined to be present inside the cabin, and when the vehicle speed is "0" (the vehicle stops), it may be determined that an occupant is not present inside the cabin. Furthermore, in another embodiment, whether an occupant is present inside the vehicle cabin may be determined by using a plurality of determination methods.

When the determination result of step S2 is positive, the processing of step S3 is executed. Where the determination result of step S2 is negative, the processing of step S4 is executed.

In step S3, the power supply control unit 5 stops the supply of power to the operation reception unit 7. More specifically, the power supply control unit instructs the power supply unit 6 to stop the supply of power to the operation reception unit 7. The power supply unit 6 stops the supply of power from the power source 8 to the operation reception unit 7 in response to this instruction. Where the power supply has already been stopped in step S3, no special operation is performed by the power supply unit 6 (the state with terminated power supply is maintained). After step S3, the processing of step S1 is executed again.

In step S4, the power supply control unit 5 supplies power to the operation reception unit 7. More specifically, the power supply control unit instructs the power supply unit 6 to supply power to the operation reception unit 7. The power supply unit 6 supplies power from the power source 8 to the operation reception unit 7 in response to this instruction. When power supply has already been performed in step S3, no special operation is performed in the power supply unit 6 (the state in which power supply is performed is maintained). After step S4, the processing of step S1 is executed again. In the present embodiment, the processing loop of the above-described steps S1 to S4 is executed at a ratio of one loop within a predetermined interval.

As described hereinabove, with the present embodiment, the supply of power to the operation reception unit 7 can be stopped (step S3) by the power supply control operation subject to the condition that the power source of the vehicle is ON (Yes in step S1) and an occupant is present in the vehicle cabin (Yes in step S2). As a result, unnecessary power supply to the operation reception unit 7 can be stopped. Therefore, power consumption can be reduced and an adverse effect produced by radiation from the sensor circuit on other circuits or antenna can be prevented.

Figure 2:
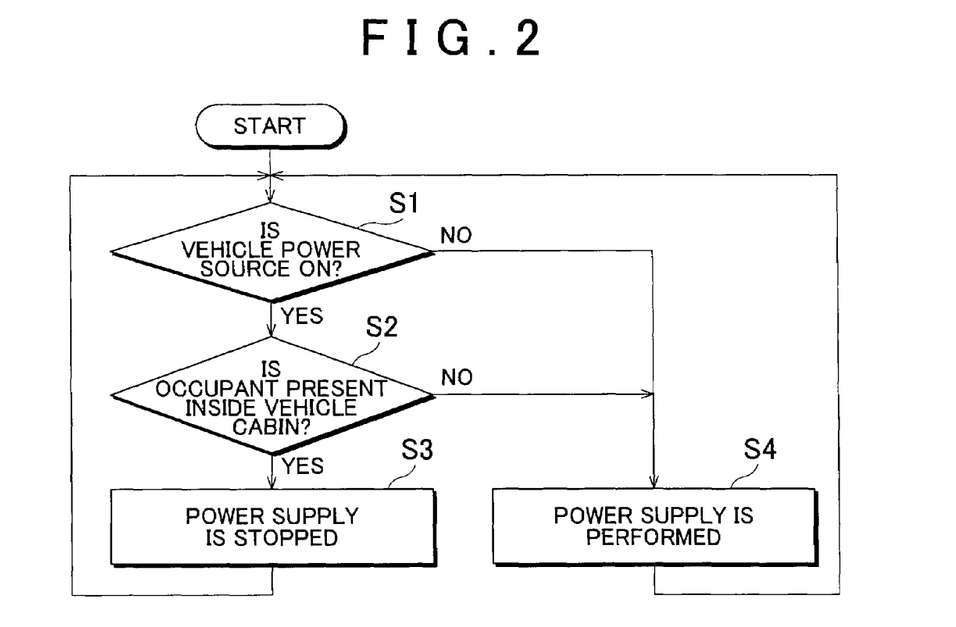
FIG. 2 is a flowchart illustrating the flow of power supply control operation performed with a power supply control unit 5 of a door lock control device 1 of the present embodiment.

In the power source control operation shown in FIG. 2, it is determined whether an occupant is present inside the vehicle cabin after determining whether the power source of the vehicle is ON, but the order of executing these two determination operations may be inverted.

In the present embodiment, only basic operation for stopping the unnecessary power supply to the operation reception unit 7 is described, and various modification thereof can be considered. The modification examples of the above-described embodiment will be described below.

In the above-described embodiment, the case can be considered in which the determination result of step S2 is negative for some reason, regardless of the actual presence of an occupant. For example, when the first determination method is used, there is a risk of the determination result of step S2 being negative when communication with the door lock control device 1 is conducted ineffectively for some reason even when the portable device 2 is inside the cabin. In this case, unnecessary power supply is performed to the operation reception unit 7. Accordingly, in the first modification example, power supply to the operation reception unit 7 is started when it is determined that an occupant is not present inside the cabin after the door has been opened and closed. The first modification example will be described below in greater detail.

Figure 3:
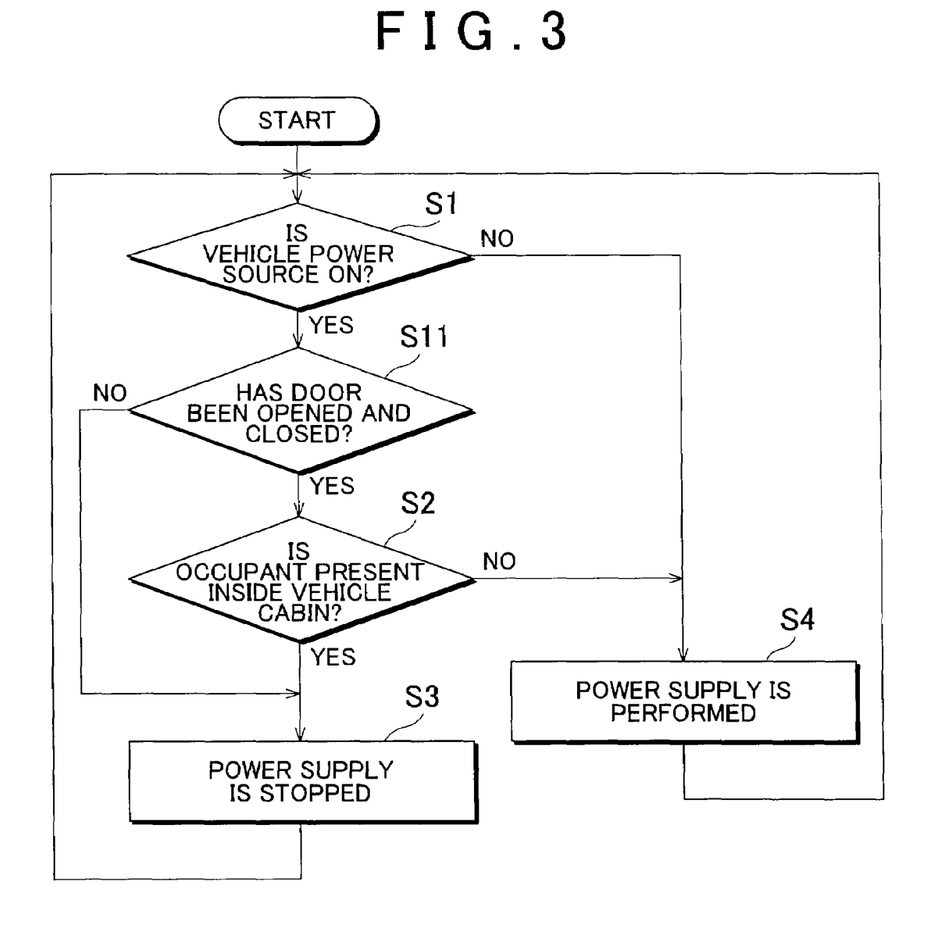
FIG. 3 is a flowchart illustrating the flow of power supply control operation in the first modification example of the present embodiment.

FIG. 3 is a flowchart illustrating the flow of power supply control processing in the first modification example. In FIG. 3 the steps for performing processing identical to those of FIG. 2 will be assigned with step numbers identical to those in FIG. 2 and detailed explanation thereof will be omitted.

In the first modification example, the processing of step S11 is executed when the determination result of step S1 is positive. In step S11, the power supply control unit 5 determines whether the door has been opened and closed after the supply of power to the operation reception unit 7 had been stopped. In the processing of step S11, it may be determined whether the door of the driver seat has been opened and closed, or it may be determined whether any door has been opened and closed. When the determination result of step S11 is positive, the processing of step S2 is executed, and when the determination result of step S11 is negative, the processing of step S3 is executed.

As described hereinabove, in the first modification example, power supply to the operation reception unit 7 remains stopped (step S3) when the door is not closed or opened (No in step S11) (after the supply of power to the operation reception unit 7 has been stopped) even in the case in which the power source of the vehicle is ON and an occupant is present inside the vehicle cabin. In other words, the power supply control unit 5 determines that it is impossible that an occupant got out of the vehicle if the door has not been opened and closed and maintains the state in which power supply to the operation reception unit 7 is stopped. By contrast, the power supply control unit determines that it is possible that the occupant got out of the vehicle if the door has been opened and closed and starts power supply when an occupant is not present in the vehicle cabin in step S2. As a result, it is possible to determine more accurately as to whether an occupant is present inside the vehicle cabin and it is possible to prevent the unnecessary power supply to the operation reception unit 7 even when the determination processing of step S2 is performed incorrectly.

Furthermore, in the first modification example, the determination processing is executed in the order of step S1, step S11, step S2, but in another embodiment, these three determination processing operations may be executed in any order. Thus, where power supply to the operation reception unit 7 is performed when either of "(condition (a)) the power source of the vehicle is OFF" and "(condition (b)) an occupant is not present inside the vehicle cabin and the door has been closed and opened" is satisfied, the above-described three determination processing operations may be executed in any order. For example, the processing of step S11 may be executed after step S3 (referring to FIG. 3, between step S3 and step S1). In this case, the power supply control unit 5 waits till the determination result of step S11 becomes positive (when the determination result is positive, the processing flow advances to step S1, and when the determination result is negative, step S11 is executed again).

In the above-described embodiment, the door lock control device 1 performs power supply control in the same manner with respect to the lock sensor and unlock sensor contained in the operation reception unit 7. By contrast, in the second modification example, the condition of power supply is made to differ between the lock sensor and unlock sensor. The second modification example will be described below in greater detail.

Figure 4:
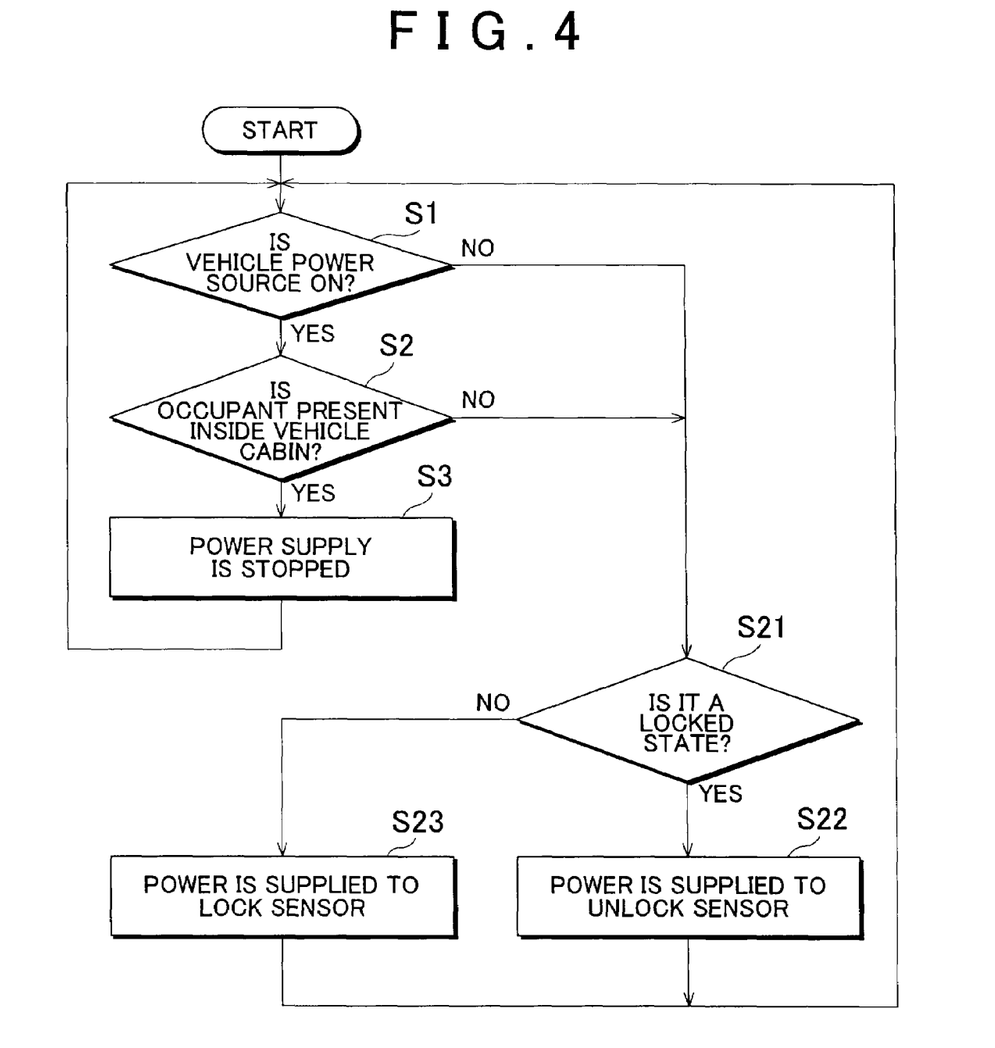
FIG. 4 is a flowchart illustrating the flow of power supply control operation in the second modification example of the present embodiment.

FIG. 4 is a flowchart illustrating the flow of power supply control operation in the second modification example. In FIG. 4 the steps for performing processing identical to those of FIG. 2 will be assigned with step numbers identical to those in FIG. 2 and detailed explanation thereof will be omitted.

In the second modification example, when the determination result of step S1 is negative or when the determination result of step S2 is negative, the processing of step S21 is executed. In step S21, the power supply control unit 5 determines whether the vehicle door is in a locked state. When the determination result of step S21 is positive, the power supply control unit 5 supplies power to an unlock sensor in step S22. More specifically, the power supply control unit instructs the power supply unit 6 to supply power to the unlock sensor of the operation reception unit 7. When the determination result of step S21 is negative, the power supply control unit 5 supplies power to the lock sensor in step S23. More specifically, the power supply control unit instructs the power supply unit 6 to supply power to the lock sensor of the operation reception unit 7. When power supply has already been carried out in step S22 or S23, no operation is performed by the power supply unit 6 (the state in which power supply is performed is maintained). After step S22 or S23, the processing of step S1 is executed again.

As described hereinabove, in the second modification example, when power is supplied to the operation reception unit 7 (No in step S1 or No in step S2), the power is supplied to the unlock sensor in a locked state and the power is supplied to the lock sensor in the unlocked state. Here, the lock sensor is necessary when the door is in the unlocked state, whereas the unlock sensor is necessary when the door is in the locked state. In other words, in the second modification example, power consumption by the sensor circuit can be further reduced by stopping power supply to a sensor to which power supply is unnecessary, with additional consideration for the door locked state.

Furthermore, in the second modification example, the processing of steps S21 to S23 may be performed separately for each door. Thus, the power supply control unit 5 may determine the locked state for each door, supply power to the unlock sensor corresponding to the door that has been determined to be in the locked state, and supply power to the lock sensor corresponding to the door that has been determined to be in the unlocked state.

In accordance with the invention, the second modification example can be also executed in the combination with the above-described first modification example. Thus, the power supply control unit 5 may execute the processing of steps S21 to S23 instead of the processing of step S4 of the first modification example.

In the above-described embodiments, power can be supplied to the operation reception unit 7 and a lock operation can be performed if an occupies gets out of the vehicle (no occupant is present in the vehicle cabin) even when the power source of the vehicle is ON. Therefore, it is possible that that an occupant will leave the vehicle, while the power source of the vehicle is ON. Accordingly, in the third modification example, an alarm is produced in such a case to notify the occupant that the power source of the vehicle is still ON. The third modification example will be described below in greater detail.

Figure 5:
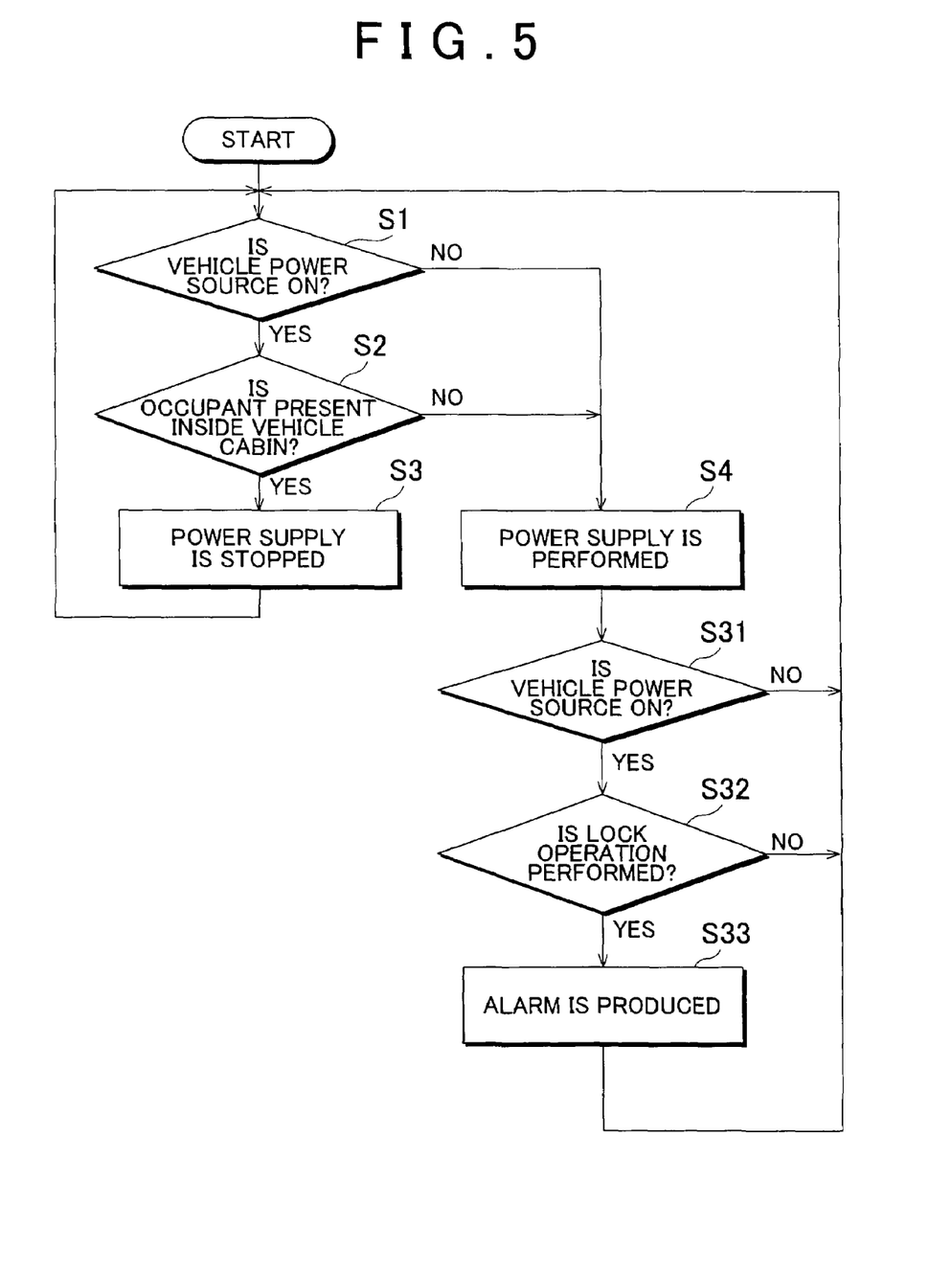
FIG. 5 is a flowchart illustrating the flow of power supply control operation in the third modification example of the present embodiment.

FIG. 5 is a flowchart illustrating the flow of power supply control operations in the third modification example. In FIG. 5, steps in which processing performed is identical to that shown in FIG. 2 will be assigned with step numbers identical to those in FIG. 2.

In the third modification example, the processing of step S31 is executed following step S4. In step S31, the power supply control unit 5 determines whether the power source of the vehicle is ON. When the determination result of step S31 is positive, the processing of step S32 is executed. When the determination result of step S31 is negative, the power supply control unit 5 returns to step S1 and executes the processing of this step.

In step S32, the power supply control unit 5 determines whether a lock operation (touch operation relating to the lock sensor) has been performed. When the determination result of step S32 is positive, the processing of step S33 is executed. When the determination result of step S32 is negative, the power supply control unit 5 returns to step S1 and executes the processing of this step.

In step S33, the power supply control unit 5 processes alarm to notify an occupant that the power source of the vehicle is still ON and the door is locked. In the present embodiment, the power source control unit 5 executing this step S33 corresponds to the alarm unit described in the claims. A specific alarm may be a sound such as buzzer or klaxon, or a display on the screen of the vehicle instrumentation panel or navigation system, or a combination of sound and display. The alarm produced in step S33 reminds the occupant that he or she forgot to turn off the power source of the vehicle.

As described hereinabove, in the third modification example, when the power source of the vehicle is ON (Yes in step S31) and the lock operation is performed (Yes in step S32) after the power supply to the operation reception unit 7 has started, an alarm (notification) is produced for the occupant. In a state of actual use of a vehicle, as described above, a case can be considered in which an occupant who was traveling in the vehicle forgets to turn the power source off and exits the vehicle, while the power source of the vehicle is still ON. In such a case, in the third modification example, an alarm can be produced when a lock operation is performed, while the power source of the vehicle is still ON, in a state in which no occupant is present in the vehicle cabin, thereby reminding the occupant that he or she forgot to turn off the power source of the vehicle.

Furthermore, in accordance with the invention the third modification example can be also executed in the combination with the above-described first and second modification examples. Thus, the power supply control unit 5 may execute the processing of steps S31 to S33 after step S4 of the first modification example. Furthermore, the power supply control unit 5 may execute the processing of steps S31 to S33 after step S22 or S23 of the second modification example. Moreover, in accordance with the invention, the first to third modification examples can be executed together.

Using the presence of the portable device 2 inside a detection area (area in which communication with the communication unit 4 is possible) that is set around the vehicle door can be considered as a power supply condition under which power is supplied to the operation reception unit 7 in another modification example. Thus, in addition to the power supply conditions of the above-described embodiments and modification examples, the power supply control unit 5 may perform power supply to the operation reception unit 7 when the portable device 2 is present in the detection area. As a result, because power supply is stopped when the occupant is at a distance from the vehicle, power consumption can be further reduced.

As describe hereinabove, the invention can be used, for example, in a door lock control device installed at a vehicle with the object of supplying power to a lock control sensor only when necessary.

While the invention has been described with reference to example embodiments thereof, it is to be understood that the invention is not limited to the example embodiments or constructions. To the contrary, the invention is intended to cover various modifications and equivalent arrangements. In addition, while the various elements of the example embodiments are shown in various combinations and configurations, which are example, other combinations and configurations, including more, less or only a single elements, are also within the scope of the invention.

What is claimed is:

1. A door lock control device that performs at least one of locking and unlocking of a door of a vehicle subject to a condition that a result of communication with a portable device has authenticated the portable device, comprising:
    an operation reception unit is a touch sensor for performing door locking and a touch sensor for performing door unlocking, the operation reception unit is provided on an outer side of the vehicle door, and receives an input for instructing at least one of the locking and unlocking of the door;
    a vehicle power source determination unit that determines whether a power source of the vehicle is ON;
    an occupant determination unit that determines whether an occupant is present in a cabin of the vehicle; and
    a power supply control unit that stops power supply to the operation reception unit when determination is made that the power source of the vehicle is ON and an occupant is present inside the vehicle cabin.

2. The door lock control device according to claim 1, wherein
    the occupant determination unit determines whether an occupant is present in the vehicle cabin on the basis of whether the portable device is present inside the cabin.

3. The door lock control device according to claim 1, further comprising:
    a camera that is installed in the vehicle and picks up an image inside the cabin, wherein
    the occupant determination unit determines whether an occupant is present in the vehicle cabin on the basis of whether an image of the occupant is present in the image picked up by the camera.

4. The door lock control device according to claim 1, further comprising:
  a seating sensor that is installed in the vehicle and detects that an occupant seats in a seat, wherein
  the occupant determination unit determines whether an occupant is present in the vehicle cabin on the basis of whether a seating occupant is detected by the seating sensor.

5. The door lock control device according to claim 1, wherein
  the power supply control unit performs power supply to the operation reception unit when the power source is OFF or when determination is made that an occupant is not present in the vehicle cabin.

6. The door lock control device according to claim 5, wherein
  the power supply control unit performs power supply to the lock sensor or the unlock sensor of the operation reception unit correspondingly to a locked state of the door when the power source of the vehicle is OFF or when it is determined that an occupant is not present in the vehicle cabin.

7. The door lock control device according to claim 6, wherein the power supply control unit supplies power to the unlock sensor in a locked state of the door and supplies power to the lock sensor in an unlocked state of the door.

8. The door lock control device according to claim 1, wherein the power supply control unit does not perform power supply to the operation reception unit after a case in which a predetermined door of the vehicle is not opened and closed in a state in which power supply to the operation reception unit is stopped.

9. The door lock control device according to claim 1, wherein
  the operation reception unit has a plurality of input units each corresponding to seats in the vehicle, the occupant determination unit determines whether an occupant is present in a predetermined seat of the vehicle, and the power supply control unit stops power supply to the input unit corresponding to a seat in which an occupant is determined to be present when the power source of the vehicle is ON.

10. The door lock control device according to claim 1, further comprising:
  an alarm unit that produces an alarm when the power source of the vehicle is ON and the vehicle door is locked in a state in which power supply is performed to the operation reception unit.

11. The door lock control device according to claim 1, wherein the power supply control unit performs power supply to the operation reception unit after an occupant is determined to be present inside the vehicle cabin after the predetermined door has been opened or closed in a state in which power supply to the operation reception unit has been stopped.

12. A door lock control device that performs at least one of locking and unlocking of a door of a vehicle subject to a condition that a result of communication with a portable device has authenticated the portable device, comprising:
  an operation reception unit is a touch sensor for performing door locking and a touch sensor for performing door unlocking, the operation reception unit is provided on an outer side of the vehicle door, and receives an input for instructing at least one of the locking and unlocking of the door when the portable device has been authenticated;
  a vehicle power source determination unit that determines whether a power source of the vehicle is ON;
  an occupant determination unit that determines whether an occupant is present in a cabin of the vehicle; and
  a power supply control unit that stops power supply to the operation reception unit while the determinations are made that the power source of the vehicle is ON and an occupant is present inside the vehicle cabin.

13. The door lock control device according to claim 1, the power supply control unit performs power supply to the lock sensor or the unlock sensor of the operation reception unit based on a locked state of the door, and
  wherein the power supply control unit supplies power to the unlock sensor and stops supply of power to the lock sensor in a locked state of the door, and supplies power to the lock sensor and stops supply of power to the unlock sensor in an unlocked state of the door.

14. The door lock control device according to claim 12, wherein the power supply control unit performs power supply to the lock sensor or the unlock sensor of the operation reception unit based on a locked state of the door, and
  wherein the power supply control unit supplies power to the unlock sensor and stops supply of power to the lock sensor in a locked state of the door, and supplies power to the lock sensor and stops supply of power to the unlock sensor in an unlocked state of the door.

* * * * *